United States Patent
Sasagawa et al.

(10) Patent No.: US 9,929,516 B1
(45) Date of Patent: Mar. 27, 2018

(54) COMMUNICATION DEVICE HAVING CONNECTORS CONFIGURED TO DETECT MISCONNECTIONS

(71) Applicant: Toshiba Memory Corporation, Tokyo (JP)

(72) Inventors: Hiroshi Sasagawa, Kawasaki Kanagawa (JP); Yuko Mori, Yokohama Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 15/448,569

(22) Filed: Mar. 2, 2017

(51) Int. Cl.
  *H01R 13/66* (2006.01)
  *H01R 13/641* (2006.01)
  *H01R 24/30* (2011.01)
  *H01R 107/00* (2006.01)

(52) U.S. Cl.
  CPC ....... *H01R 13/6683* (2013.01); *H01R 13/641* (2013.01); *H01R 24/30* (2013.01); *H01R 2107/00* (2013.01); *H01R 2201/04* (2013.01)

(58) Field of Classification Search
  CPC ............ H01R 13/6683; H01R 2201/04; H01R 2107/00; H01R 24/30; H01R 13/641; H04L 41/12; H04L 41/0809; H04B 10/0771; H05B 19/052; G06F 15/161; G01R 31/041
  See application file for complete search history.

(56) References Cited

U.S. PATENT DOCUMENTS

| | | | |
|---|---|---|---|
| 5,170,113 A | 12/1992 | Albonesi | |
| 5,448,574 A * | 9/1995 | Yamaguchi | G01R 31/041 324/66 |
| 5,493,650 A * | 2/1996 | Reinke | H04L 41/0809 709/221 |
| 5,678,005 A * | 10/1997 | Taylor | G01R 31/041 709/224 |
| 6,374,206 B1 * | 4/2002 | Soji | G06F 3/0614 703/21 |
| 7,555,680 B2 * | 6/2009 | Kato | G05B 19/052 370/248 |

(Continued)

FOREIGN PATENT DOCUMENTS

JP    H04-132179 A    5/1992
JP    H06-096812 A    4/1994

*Primary Examiner* — Jean F Duverne
(74) *Attorney, Agent, or Firm* — Patterson & Sheridan, LLP

(57) ABSTRACT

A device having first and second connectors configured for physical connection with a cable having first and second wires, wherein each of the first and second connectors includes a first pin for connection with a first wire of the cable and a second pin for connection with a second wire of the cable, includes a ground terminal connected to the first pin of the first connector and to the second pin of the second connector; a first pull-up resistor connected to the second pin of the first connector; a second pull-up resistor connected to the first pin of the second connector; and a signal detecting circuit connected to the second pin of the first connector through the first pull-up resistor and to the first pin of the second connector through the second pull-up resistor, the signal detecting circuit being configured to detect a signal level of second pin of the first connector and to detect a signal level of first pin of the second connector.

17 Claims, 9 Drawing Sheets

(56) References Cited

U.S. PATENT DOCUMENTS 8,351,782 B1 * 1/2013 Vahdat ............... H04B 10/0771
398/12
8,604,926 B2 * 12/2013 Nolterieke ............. H04L 41/12
340/502
9,176,923 B2 * 11/2015 Bower, III ............ G06F 15/161

* cited by examiner

COMMUNICATION DEVICE HAVING CONNECTORS CONFIGURED TO DETECT MISCONNECTIONS

BACKGROUND

A system consisting of communication devices, such as servers or storage devices, which are connected to each other with communication cables is generally known. In a case where each of the communication devices has a plurality of connectors, each having the same shape, there is a possibility that one connector of one communication device is mistakenly connected with an improper connector of another communication device.

It is possible to avoid such misconnection by making the shape of connectors different from each other. However, such a solution requires a plurality of types of communication cables which have different connector shapes, and thereby increases both cost and complexity.

DETAILED DESCRIPTION

Figure 1:
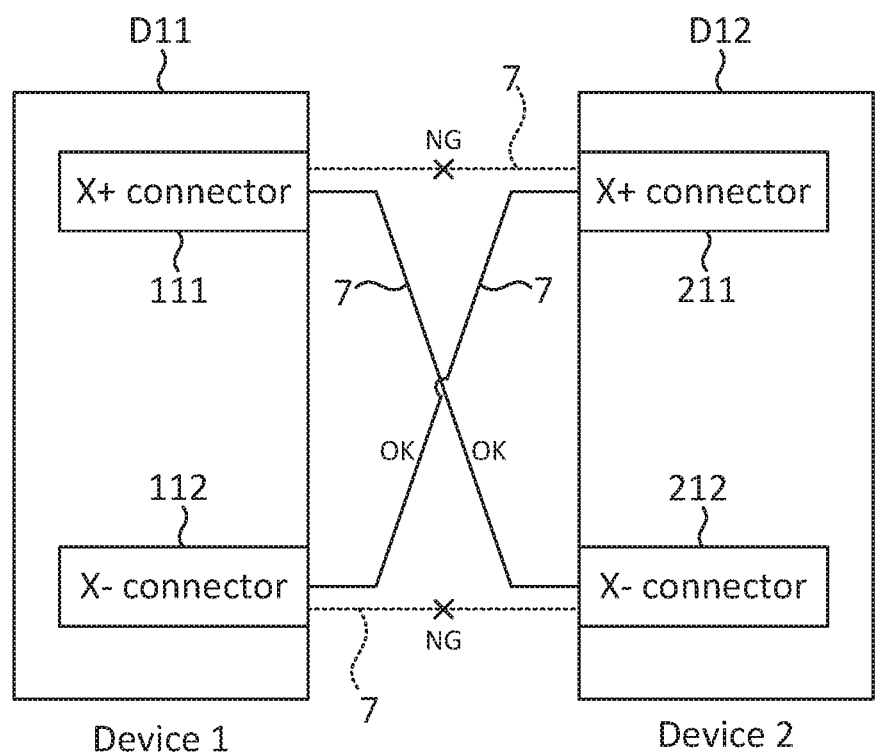
FIG. 1 is a diagram depicting a configuration of connectors of communication devices, according to a first embodiment.

A device having first and second connectors configured for physical connection with a cable having first and second wires, wherein each of the first and second connectors includes a first pin for connection with a first wire of the cable and a second pin for connection with a second wire of the cable, according to an embodiment includes a ground terminal connected to the first pin of the first connector and to the second pin of the second connector; a first pull-up resistor connected to the second pin of the first connector; a second pull-up resistor connected to the first pin of the second connector; and a signal detecting circuit connected to the second pin of the first connector through the first pull-up resistor and to the first pin of the second connector through the second pull-up resistor, the signal detecting circuit being configured to detect a signal level of second pin of the first connector and to detect a signal level of first pin of the second connector.

A device having first, second, third and fourth connectors configured for physical connection with a cable having first, second, third and fourth wires, wherein each of the first, second, third and fourth connectors includes a first pin for connection with a first wire of the cable, a second pin for connection with a second wire of the cable, a third pin for connection with a third wire of the cable and a fourth pin for connection with a fourth wire of the cable, according to another embodiment includes a ground terminal connected to the first pin of the first connector, to the fourth pin of the second connector, to the second pin of the third connector and to the third pin of the fourth connector; a first pull-up resistor connected to the second pin of the first connector; a second pull-up resistor connected to the third pin of the second connector; a third pull-up resistor connected to the first pin of the third connector; a fourth pull-up resistor connected to the fourth pin of the fourth connector; and a signal detecting circuit connected to the second pin of the first connector through the first pull-up resistor, to the third pin of the second connector through the second pull-up resistor, to the first pin of the third connector through the third pull-up resistor, and to the fourth pin of the fourth connector through the fourth pull-up resistor, the signal detecting circuit being configured to detect signal levels of the second pin of the first connector, the third pin of the second connector, the first pin of the third connector, and the fourth pin of the fourth connector.

A device having first, second, third and fourth connectors configured for physical connection with a cable having first, second, third, fourth, fifth and sixth wires, wherein each of the first, second, third and fourth connectors includes a first pin for connection with a first wire of the cable, a second pin for connection with a second wire of the cable, a third pin for connection with a third wire of the cable, a fourth pin for connection with a fourth wire of the cable, a fifth pin for connection with a fifth wire of the cable and a sixth pin for connection with a sixth wire of the cable, according to another embodiment, includes a ground terminal connected to the first pin of the first connector, to the fourth pin of the second connector, to the second pin of the third connector and to the fourth pin of the fourth connector; a first pull-up resistor connected to the second pin of the first connector; a second pull-up resistor connected to the sixth pin of the first connector; a third pull-up resistor connected to the fourth pin of the second connector; a fourth pull-up resistor connected to the sixth pin of the second connector; a fifth pull-up resistor connected to the first pin of the third connector; a sixth pull-up resistor connected to the sixth pin of the third connector; a seventh pull-up resistor connected to the fifth pin of the fourth connector; an eighth pull-up resistor connected to the sixth pin of the fourth connector; and a signal detecting circuit configured to a signal detecting circuit connected to the second pin of the first connector through the first pull-up resistor, to the sixth pin of the first connector through the second pull-up resistor, to the fourth pin of the second connector through the third pull-up resistor, to the sixth pin of the second connector through the fourth pull-up resistor, to the first pin of the third connector through the fifth pull-up resistor, to the sixth pin of the third connector through the sixth pull-up resistor, to the fifth pin of the fourth connector through the seventh pull-up resistor, and to the sixth pin of the fourth connector through the eighth pull-up resistor, the signal detecting circuit being configured to detect signal levels of the second and sixth pins of the first connector, the fourth and sixth pins of the second connector, the first and sixth pins of the third connector, and the fifth and sixth pins of the fourth connector.

A communication device according to a first embodiment is explained with reference to FIGS. 1 to 3.

FIG. 1 is a diagram depicting a configuration of connectors of communication devices, according to a first embodiment.

As shown in FIG. 1, a communication device D11 is connected with a communication device D12 with communication cables 7, which may be, for example, ethernet cables. In this embodiment, communication devices D11 and D12 are exemplified as storage devices or servers, but they may be exemplified as other devices requiring connections through communication cables.

The communication devices D11 and D12 have the same connector arrangement. That is, the communication device D11 has an X+ connector 111 and an X− connector 112. Similarly, the communication device D12 has an X+ connector 211 and an X− connector 212. The shape and the pin configuration of the X+ connector 111 are the same as the shape and the pin configuration of the X− connector 112, and the shape and the pin configuration of the X+ connector 211 are the same as the shape and the pin configuration of the X− connector 212. Further, in the first embodiment, all of the shape and the pin configuration of the connectors 111, 112, 211 and 212 are the same.

For a proper connection (e.g., correct connection in accordance with a predetermined connection rule), the X+ connector 111 of the communication device D11 should be connected with the X− connector 212 of the communication device D12, and the X+ connector 211 of the communication device D12 should be connected with the X− connector 112 of the communication device D11. Therefore, the other possible connection between the connectors 111, 112, 211 and 212 is an improper connection (e.g., incorrect connection which is not in accordance with a predetermined connection rule) and depicted as "NG" in FIG. 1.

Figure 2:
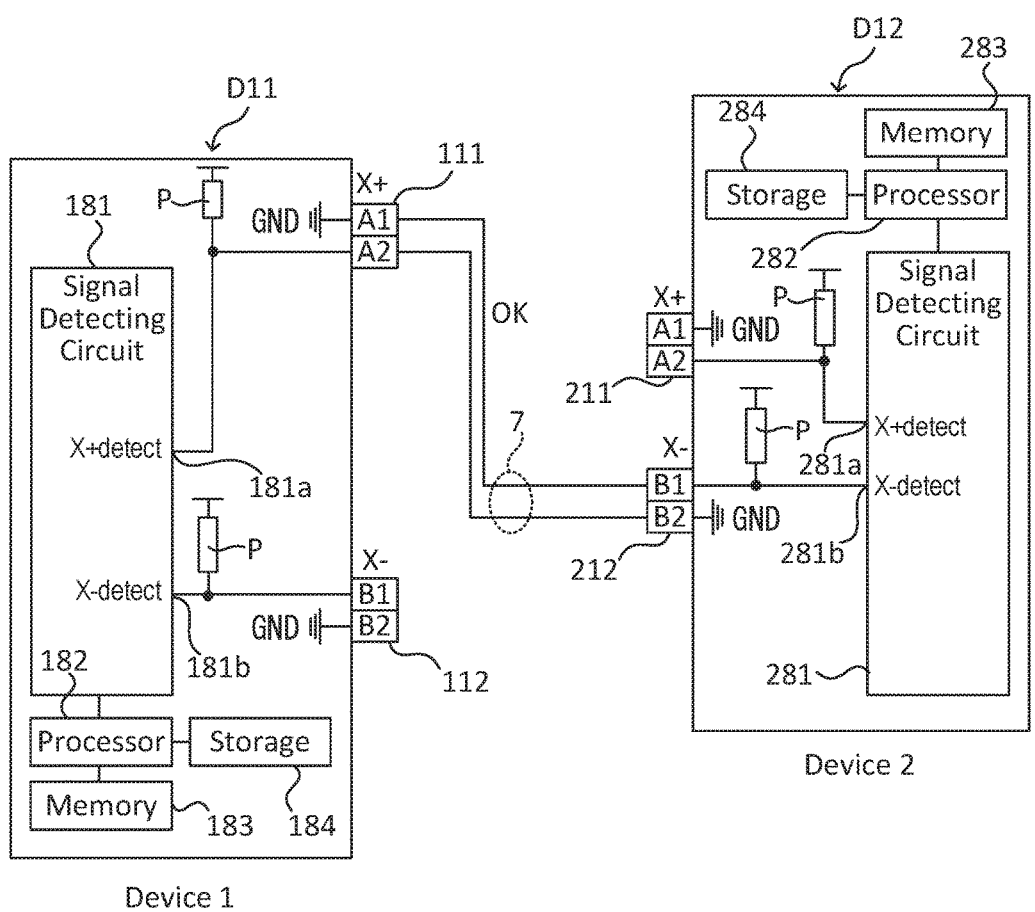
FIG. 2 is a diagram depicting an example circuit configuration of the communication devices shown in FIG. 1, and a proper connection in the example circuit configuration.

FIG. 2 is a diagram depicting an example circuit configuration of the communication devices shown in FIG. 1, and a proper connection in the example circuit configuration.

As shown in FIG. 2, the communication device D11 includes the X+ connector 111, the X− connector 112, a signal detecting circuit 181, processor 182, memory 183, storage 184 and a plurality of pull-up resistors P.

The X+ connector 111 has pins A1 and A2. The X− connector 112 has pins B1 and B2. The pin A1 is connected to the ground. The pin A2 is connected to an X+ detect port 181a of the signal detecting circuit 181 through the pull-up resistor P. The pin B1 is connected to an X− detect port 181b of the signal detecting circuit 181 through the pull-up resistor P. The pin B2 is connected to the ground. In this embodiment, each of pins A1, A2, B1 and B2 is an electrode of the connector. Further, the pull-up resistor is a resistor connected between a signal wire electrically connected to one of the pins and a positive power supply voltage, that ensures that the signal carried on the wire will be a high logic level if the pin is not connected to any external device or is improperly connected to the external device, and will be a low logic level if the pin is properly connected to the external device The signal detecting circuit 181 is a circuit that is configured to detect signal levels (high level or low level) and output the detected signal levels to the processor 182 that is executing an application software to determine whether the signal levels indicate a proper connection or an improper connection of the communication device D11. The signal detecting circuit 181 may be implemented as an ASIC (Application Specific Integrated Circuit) or programmable logic devices such as FPGA (Field Programmable Gate Array).

The processor 182 is, for example, a CPU. The processor 182 may be replaced with an ASIC (Application Specific Integrated Circuit) or programmable logic devices such as FPGA (Field Programmable Gate Array). The processor 182 is connected to the signal detecting circuit 181 through a BUS.

Further, the memory 183 and the storage 184 are connected to the processor 182 through a BUS.

In one embodiment, the memory 183 is a semiconductor memory. The memory 183 includes a ROM (Read Only Memory) that stores a control program of the processor 182 and a RAM (Random Access Memory) that provides a temporary memory space for the processor 182.

The processor 182 determines a state of the connection between the communication device D11 and D12 based on the signal from the signal detecting circuit 181 by executing a control program or the like stored in the memory 183 or the storage 184.

The storage 184 stores application programs and the OS in a non-volatile manner. Examples of the storage 184 include a magnetic-storage device, such as a hard disk drive, an optical storage device, a semiconductor storage device (flash memory or the like), or a combination of these devices.

The communication device D12 includes the X+ connector 211, the X− connector 212, a signal detecting circuit 281, processor 282, memory 283, storage 284 and a plurality of pull-up resistors P.

In this embodiment, each of the X+ connector 211, the X− connector 212, a signal detecting circuit 281, processor 282, memory 283, storage 284 and a plurality of pull-up resistors P of the communication device D12 has the same function as each of the X+ connector 111, the X− connector 112, a signal detecting circuit 181, processor 182, memory 183, storage 184 and a plurality of pull-up resistors P of the communication device D11 respectively.

A connection checking process based on the above configuration is explained below.

In FIG. 2, the X+ connector 111 of the communication device D11 is properly connected with the X− connector 212 of the communication device D12 using communication cable 7, which has two wires, a first wire which connects the A1 pin of X+ connector 111 to the B1 pin of X− connector 212 and a second wire which connects the A2 pin of X+ connector 111 to the B2 pin of X− connector 212. The connector interface on either end of the communication cable 7 is the same so that it can be joined to either X+ connector 111 and X− connector 212. However, either the pins or the connector interface on either end is configured so that the connector interface on either end of the communication cable 7 cannot be physically joined to the connector (e.g., X+ connector 111 or X− connector 212) unless the connection interface is aligned properly with respect to the pins. This ensures that, when the communication cable 7 is physically joined to the X+ connector 111 and the X− connector 212, the "1" pins (A1 and B1) are connected to each other through the first wire and the "2" pins (A2 and B2) are connected to each other through the second wire.

In this state, by connecting the pin A1 of the X+ connector 111 to the pin B1 of the X− connector 212, since the pin A1 of the X+ connector 111 is connected to the ground, the signal received at the x− detect port 281b from the pull-up resistor P between the pin B1 and the signal detecting circuit 281 will be at ground level (e.g., signal level=0). The processor 282 determines that the X− connector 212 is properly connected to the X+ connector 111 when the signal detected by the signal detecting circuit 281 is at ground level.

In addition, by connecting the pin A2 of the X+ connector 111 to the pin B2 of the X− connector 212, since the pin B2 of the X− connector 212 is connected to the ground, the signal received at the x+ detect port 181a from the pull-up resistor P between the pin A2 and the signal detecting circuit 181 will be at ground level. The processor 182 determines that the X+ connector 111 is properly connected to the X− connector 212 when the signal detected by the signal detecting circuit 181 is at ground level.

When the X− connector 112 of the communication device D11 is connected with the X+ connector 211 of the communication device D12, the connection checking process is performed according to the same process as the above and will confirm that the connection is proper.

Figure 3:
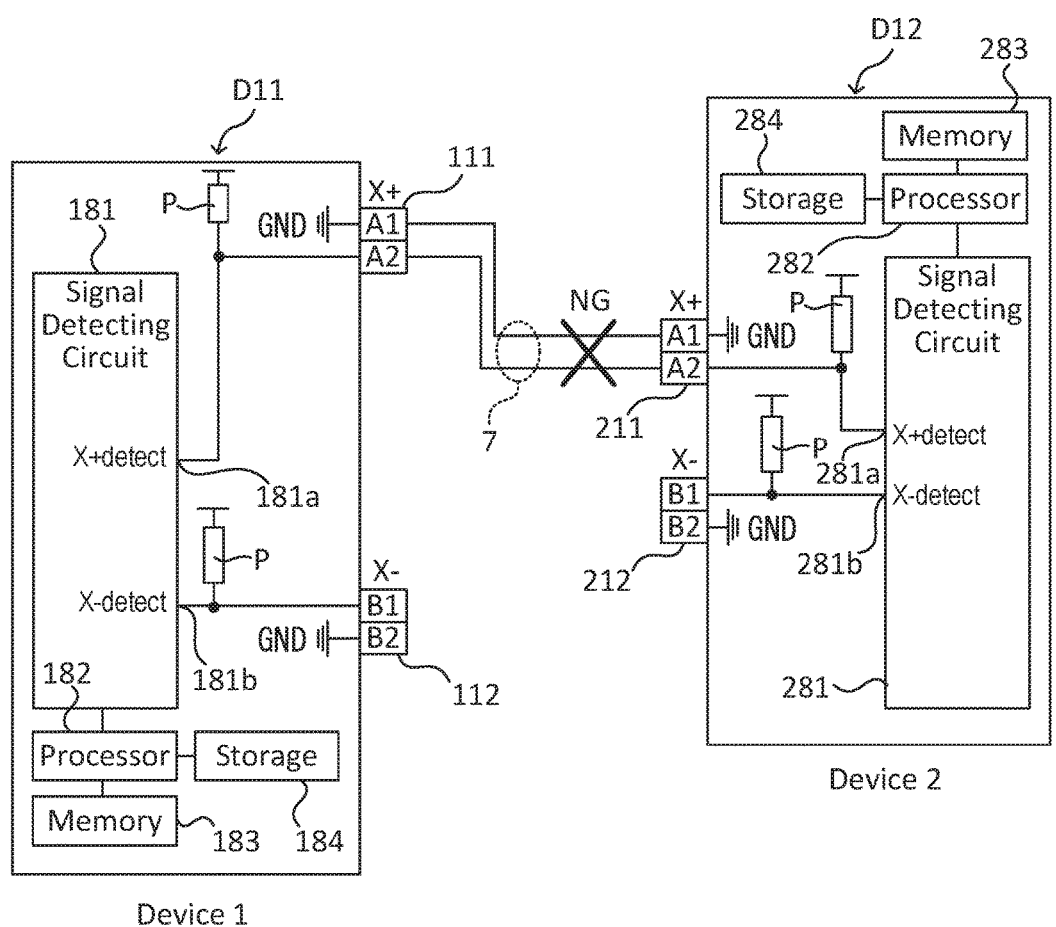
FIG. 3 is a diagram depicting an example circuit configuration of the communication devices shown in FIG. 1, and an improper connection in the example circuit configuration.

FIG. 3 is a diagram depicting an example circuit configuration of the communication devices shown in FIG. 1, and an improper connection in the example circuit configuration.

In FIG. 3, the X+ connector 111 of the communication device D11 is improperly connected with the X+ connector 211 of the communication device D12. In this state, by connecting the pin A1 of the X+ connector 111 to the pin A1 of the X+ connector 211, since the pin A2 of the X+ connector 111 is connected to the pull-up resistor P between the pin A2 and the signal detecting circuit 181 and the pin A2 of the X+ connector 211 is connected to the pull-up resistor P between the pin A2 and the signal detecting circuit 281, the signal received at the x+ detect port 181a and the x+ detect port 281a will be at a high level that is above a ground level (e.g., signal level=1)". The processor 282 determines that the X+ connector 211 is improperly connected to the connector except for the X− connector 112 when the signal detected by the signal detecting circuit 281 is at a high level.

The connection between the pin A1 of the X+ connector 111 and the pin A1 of the X+ connector 211 does not generate any detection signals, because both the pins A1 of the X+ connector 111 and the pin A1 of the X+ connector 211 are connected to the ground.

When the X− connector 112 of the communication device D11 is connected with the X− connector 212 of the communication device D12, the connection checking process is performed according to the same process as the above and will confirm that the connection is improper.

As described above, the processors 182 and 282 can determine whether the connectors are properly connected each other based on, for example, the position of the pin which is connected to the ground.

According to the first embodiment, it is possible to electrically detect an improper connection in a case where the communication devices have two types of connectors based on the signals received by the signal detecting circuits, and there is no need to prepare different types of communication cables.

A communication device according to a second embodiment is explained with reference to FIGS. 4 to 6.

In the following description of the second embodiment, components having functions same as those explained in the first embodiment are denoted by the same reference numerals and signs, and explanation of such components is repeated as needed.

Figure 4:
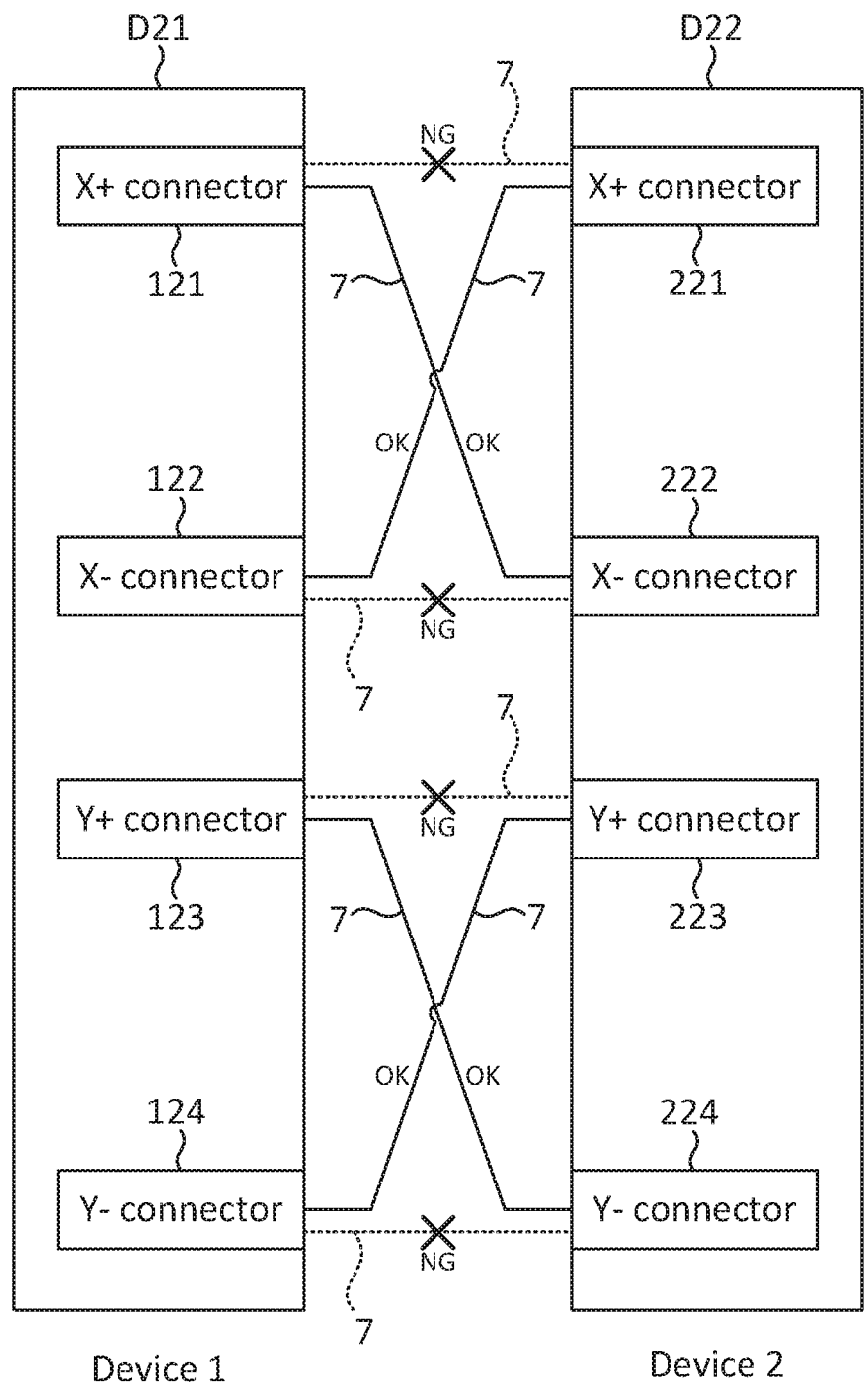
FIG. 4 is a diagram depicting a configuration of connectors of communication devices, according to a second embodiment.

FIG. 4 is a diagram depicting a configuration of connectors of communication devices, according to a second embodiment.

As shown in FIG. 4, a communication device D21 is connected with a communication device D22 with communication cables 7, which may be, for example, ethernet cables. In this embodiment, communication devices D21 and D22 are exemplified as storage devices or servers, but they may be exemplified as other devices requiring connections through communication cables.

The communication devices D21 and D22 have the same connector arrangement. That is, the communication device D21 has an X+ connector 121, an X− connector 122, a Y+ connector 123 and a Y− connector 124. Similarly, the communication device D21 has an X+ connector 221, an X− connector 222, a Y+ connector 223 and a Y− connector 224. The shape and the pin configuration of the X+ connector 121, the X− connector 122, the Y+ connector 123 and the Y− connector 124 are the same, and the shape and the pin configuration of the X+ connector 221, the X− connector 222, the Y+ connector 223 and the Y− connector 224 are the same. Further, in the second embodiment, all of the shape and the pin configuration of the connectors 121, 122, 123, 124, 221, 222, 223 and 224 are the same.

For a proper connection, the X+ connector 121 of the communication device D21 should be connected with the X− connector 222 of the communication device D22, the X+ connector 221 of the communication device D22 should be connected with the X− connector 122 of the communication device D21, the Y+ connector 123 of the communication device D21 should be connected with the Y− connector 224 of the communication device D22, and the Y+ connector 223 of the communication device D22 should be connected with the Y− connector 124 of the communication device D21. Therefore, each of the other possible connections between the connectors 121, 122, 123, 124, 221, 222, 223 and 224 is an improper connection. Four such possible improper connections are depicted as "NG" in FIG. 4.

Figure 5:
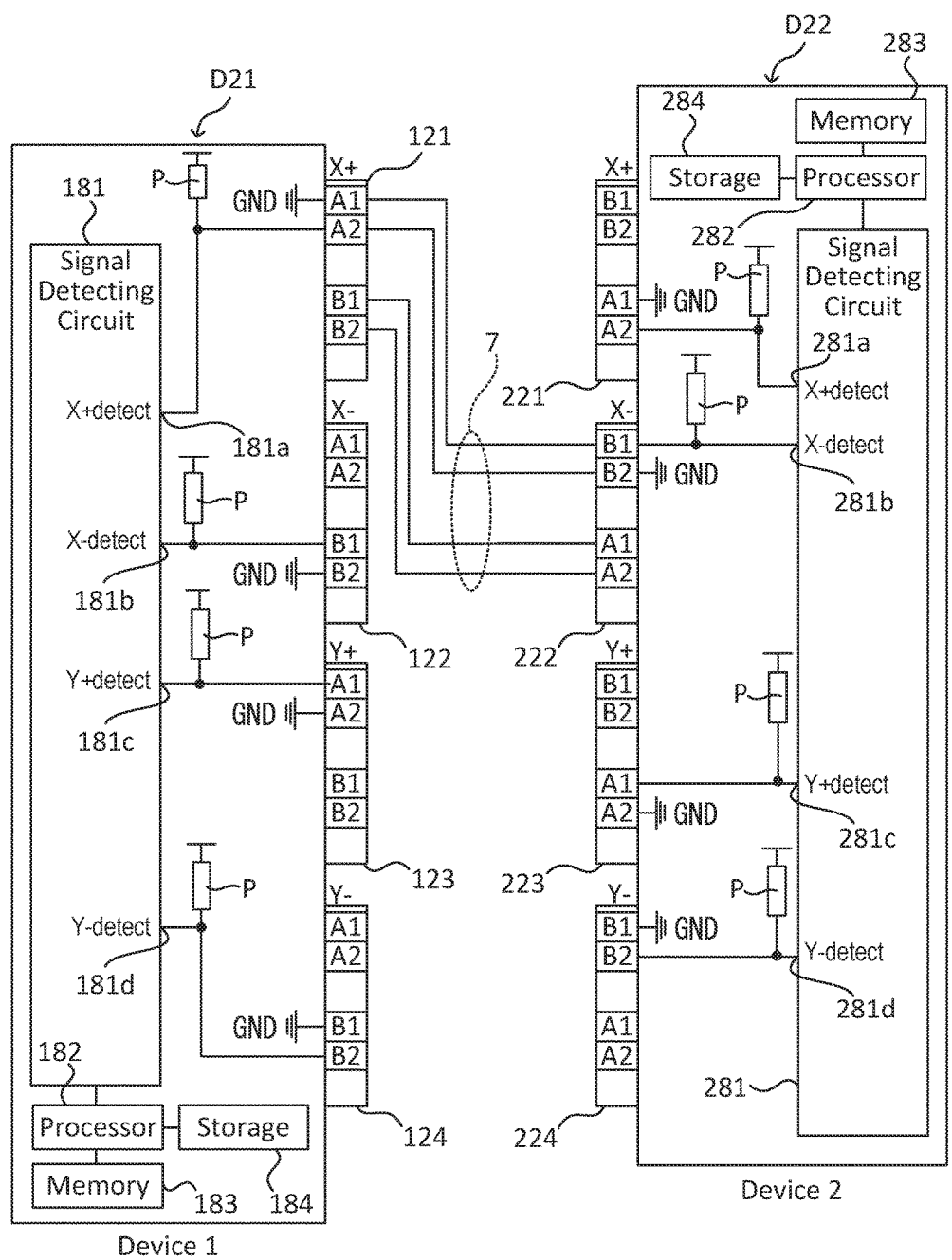
FIG. 5 is a diagram depicting an example circuit configuration of the communication devices shown in FIG. 4, and a proper connection in the example circuit configuration.

FIG. 5 is a diagram depicting an example circuit configuration of the communication devices shown in FIG. 4, and a proper connection in the example circuit configuration.

As shown in FIG. 5, the communication device D21 includes the X+ connector 121, the X− connector 122, Y+ connector 123, Y− connector 124, a signal detecting circuit 181, processor 182, memory 183, storage 184 and a plurality of pull-up resistors P.

Each the X+ connector 121, the X− connector 122, Y+ connector 123, and Y− connector 124 has pins A1, A2, B1 and B2. The pin A1 of the X+ connector 121, the pin B2 of the X− connector 122, the pin A2 of the Y+ connector 123, and the pin B1 of the Y− connector 124 are connected to the ground. The pin A2 of the X+ connector 121 is connected to an X+ detect port 181a of the signal detecting circuit 181 through the pull-up resistor P. The pin B1 of the X− connector 122 is connected to an X− detect port 181b of the signal detecting circuit 181 through the pull-up resistor P. The pin A1 of the Y+ connector 123 is connected to a Y+ detect port 181c of the signal detecting circuit 181 through the pull-up resistor P. The pin B2 of the Y− connector 124 is connected to a Y− detect port 181d of the signal detecting circuit 181 through the pull-up resistor P.

The communication device D22 includes the X+ connector 221, the X− connector 222, Y+ connector 223, Y− connector 224, a signal detecting circuit 281, processor 282, memory 283, storage 284 and a plurality of pull-up resistors P.

In this embodiment, each of the X+ connector 221, the X− connector 222, Y+ connector 223, Y− connector 224, a signal detecting circuit 281, processor 282, memory 283, storage 284 and a plurality of pull-up resistors P of the communication device D22 has the same function as each of the X+ connector 121, the X− connector 122, Y+ connector 123, Y− connector 124, a signal detecting circuit 181, processor 182, memory 183, storage 184 and a plurality of pull-up resistors P of the communication device D21 respectively.

A connection checking process based on the above configuration according to the second embodiment is explained below.

In FIG. 5, the X+ connector 121 of the communication device D21 is properly connected with the X− connector 222 of the communication device D22 using communication cable 7, which has four wires, a first wire which connects the A1 pin of X+ connector 121 to the B1 pin of X− connector 222, a second wire which connects the A2 pin of X+ connector 121 to the B2 pin of X− connector 222, a third wire which connects the B1 pin of X+ connector 121 to the A1 pin of X− connector 222, and a fourth wire which connects the B2 pin of X+ connector 121 to the A2 pin of X− connector 222. The connector interface on either end of the communication cable 7 is the same so that it can be joined to either X+ connector 121 and X− connector 222. However, either the pins or the connector interface on either end is configured so that the connector interface on either end of the communication cable 7 cannot be physically joined to the connector (e.g., X+ connector 111 or X− connector 212) unless the connection interface is aligned properly with respect to the pins. This ensures that, when the communication cable 7 is physically joined to the X+ connector 121 and the X− connector 222, the "1" pins (A1 and B1) are connected to each other through the first and third wires and the "2" pins (A2 and B2) are connected to each other through the second and fourth wires.

In this state, by connecting the pin A1 of the X+ connector 121 to the pin B1 of the X− connector 222, since the pin A1 of the X+ connector 121 is connected to the ground, the signal received at the X− detect port 281b from the pull-up resistor P between the pin B1 and the signal detecting circuit 281 will be at ground level. The processor 282 determines that the X− connector 222 is properly connected to the X+ connector 121 when the signal detected by the signal detecting circuit 281 is at ground level.

In addition, by connecting the pin A2 of the X+ connector 121 to the pin B2 of the X− connector 222, since the pin B2 of the X− connector 222 is connected to the ground, the signal received at the X+ detect port 181a from the pull-up resistor P between the pin A2 and the signal detecting circuit 181 will be at ground level. The processor 182 determines that the X+ connector 121 is properly connected to the X− connector 222 when the signal detected by the signal detecting circuit 181 is at ground level.

When the X− connector 122 of the communication device D21 is connected with the X+ connector 221 of the communication device D22, the Y+ connector 123 of the communication device D21 with the Y− connector 224 of the communication device D22, and the Y− connector 124 of the communication device D21 with the Y+ connector 223 of the communication device D22, the connection checking process is performed according to the same process as described above and will confirm that each such connection is proper.

Figure 6:
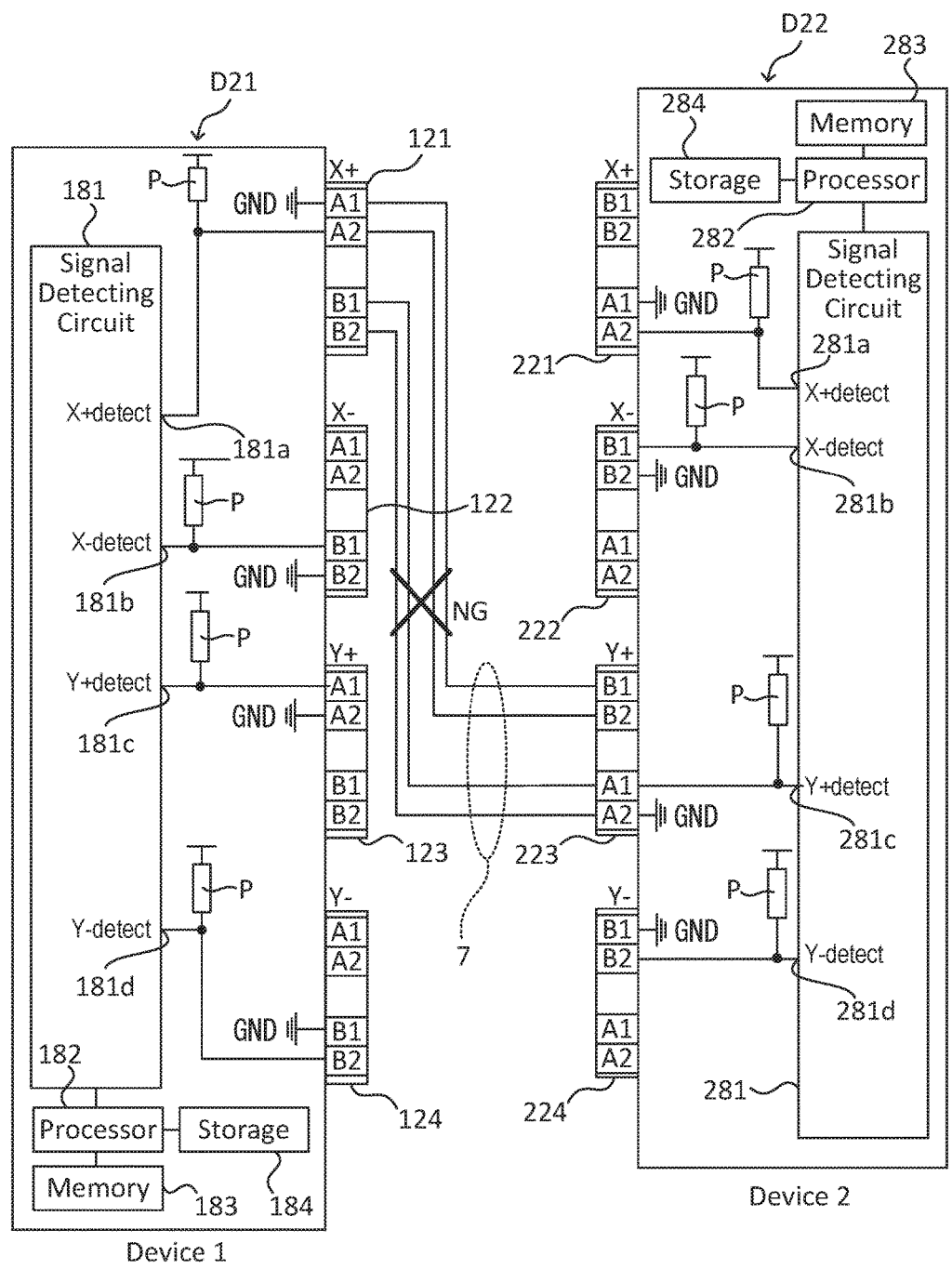
FIG. 6 is a diagram depicting an example circuit configuration of the communication devices shown in FIG. 4, and an improper connection in the example circuit configuration.

FIG. 6 is a diagram depicting an example circuit configuration of the communication devices shown in FIG. 4, and an improper connection in the example circuit configuration.

In FIG. 6, the X+ connector 121 of the communication device D21 is improperly connected with the Y+ connector 223 of the communication device D22. In this state, by connecting the pin A2 of the X+ connector 111 to the pin B2 of the Y+ connector 223, since the pin B2 of the Y+ connector 223 is not connected to any element in the communication device D22 and the pin B1 of the X+ connector 121 is not connected to any element in the communication device D21, the signal received at the X+ detect port 181a and the Y+ detect port 281c will be at a high level that is above a ground level.

As a result of the signal detected at X+ detect port 181a of the signal detecting circuit 181 being at a high level, the processor 182 determines that the X+ connector 121 is improperly connected. Similarly, as a result of the signal detected at Y+ detect port 281c of the signal detecting circuit 281 being at a high level, the processor 282 determines that the Y+ connector 223 is improperly connected.

An improper connection will be detected in a similar manner when each of the X+ connector 121, the X− connector 122, the Y+ connector 123, the Y− connector 124, X+ connector 221, the X− connector 222, the Y+ connector 223 and the Y− connector 224 is connected to any connector except for the corresponding proper connector.

According to the second embodiment, it is possible to electrically detect an improper connection in a case where the communication devices have four types of connectors based on the signals received by the signal detecting circuits, and there is no need to prepare different types of communication cables.

A communication device according to a third embodiment is explained with reference to FIGS. 7 to 9.

In the following description of the third embodiment, components having functions same as those explained in the first and second embodiments are denoted by the same reference numerals and signs, and explanation of such components is repeated as needed.

Figure 7:
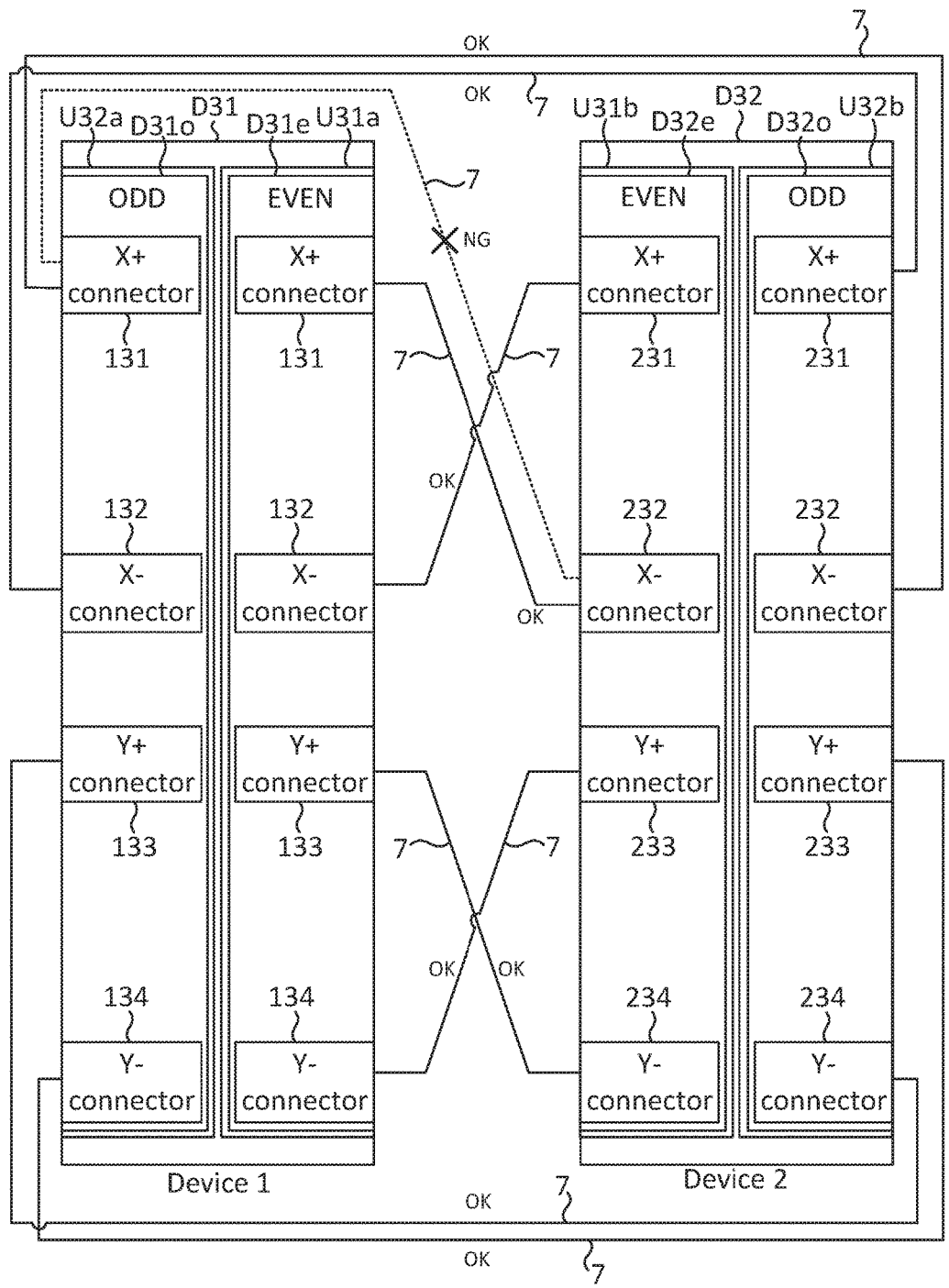
FIG. 7 is a diagram depicting a configuration of connectors of communication devices, according to a third embodiment.

FIG. 7 is a diagram depicting a configuration of connectors of communication devices, according to a third embodiment.

As shown in FIG. 7, communication devices D31o, D31e, D32e, and D32o are inserted respectively into slots U32a, U31a, U31b, and U32b. Slots U32a, U31a, U31b, and U32b have the same connector arrangement so that any of the communication devices D31o, D31e, D32e, and D32o may be inserted into any of the slots U32a, U31a, U31b, and U32b. However, each of the slots U32a, U31a, U31b, and U32b has a slot ID which is even or odd. An even slot has an even numbered slot ID and an odd slot has an odd numbered slot ID. An even numbered slot asserts a high level signal to a connector pin designated for communicating even/odd slot ID so that the communication device can detect that it is being inserted into an even numbered slot. On the other hand, an odd numbered slot asserts a low level signal to the connector pin designated for communicating even/odd slot ID so that the communication device can detect that it is being inserted into an odd numbered slot. FIG. 7 further illustrates the communication device D31o connected with the communication device D32o, and the communication device D31e connected with the communication device D32e, with communication cables 7, which may be, for example, ethernet cables. In this embodiment, the communication devices D31o, D31e, D32e, and D32o are exemplified as storage devices or servers but they may be exemplified as other devices requiring connections through communication cables.

Each of the communication devices D31o, D31e, D32e, and D32o has an X+ connector 131/231, an X− connector 132/232, a Y+ connector 133/233 and a Y− connector 134/234. A proper connection is between X+ and X− connectors and between Y+ and Y− connectors as described in the second embodiment. According to the third embodiment, the communication devices connected to each other by the communication cable 7 are required to be both inserted into even numbered slots or odd numbered slots. As shown in FIG. 7 as "NG" a connection between a communication device inserted into an odd numbered slot and a communication device inserted into an even numbered slot is not proper.

The shape and the pin configuration of the X+ connector 131, the X− connector 132, the Y+ connector 133 and the Y− connector 134 are the same, and the shape and the pin configuration of the X+ connector 231, the X− connector 232, the Y+ connector 233 and the Y− connector 234 are the same. Further, in the third embodiment, all of the shape and the pin configuration of the connectors 131, 132, 133, 134, 231, 232, 233 and 234 are the same.

Figure 8:
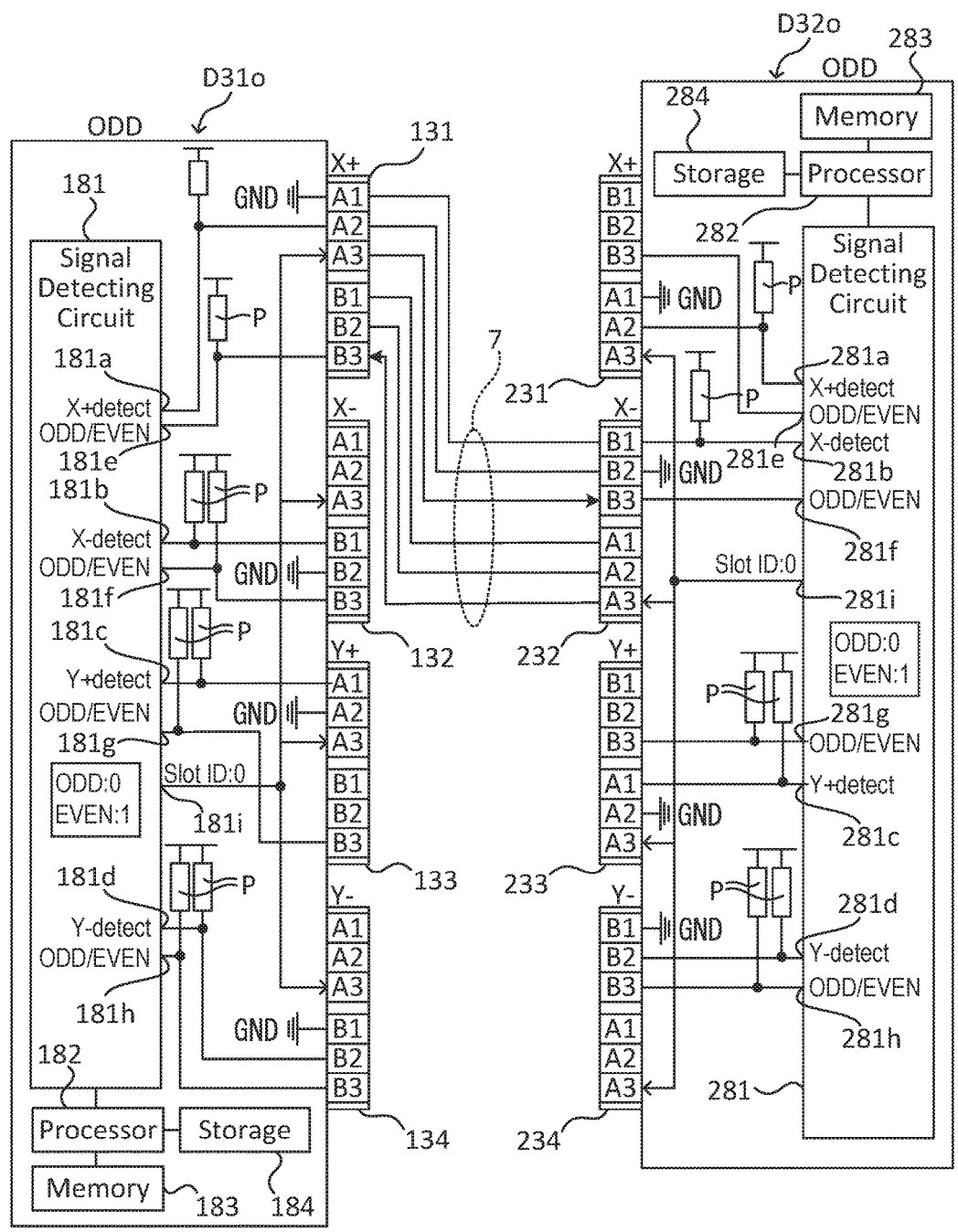
FIG. 8 is a diagram depicting an example circuit configuration of the communication devices shown in FIG. 7, and a proper connection in the example circuit configuration.

FIG. 8 is a diagram depicting an example circuit configuration of the communication devices shown in FIG. 7, and a proper connection in the example circuit configuration. In FIG. 8, the connection between the communication device D31o inserted into the odd numbered slot U32a and the communication device D32o inserted into the odd numbered slot U32b is shown as an example of a proper connection.

As shown in FIG. 8, the communication device D31o includes the X+ connector 131, the X− connector 132, Y+ connector 133, Y− connector 134, a signal detecting circuit 181, processor 182, memory 183, storage 184 and a plurality of pull-up resistors P.

Each the X+ connector 131, the X− connector 132, Y+ connector 133, and Y− connector 134 has pins A1, A2, A3, B1, B2 and B3. The pin A1 of the X+ connector 131, the pin B2 of the X− connector 132, the pin A2 of the Y+ connector 133, and the pin B1 of the Y− connector 134 are connected to the ground. The pin A2 of the X+ connector 131 is connected to an X+ detect port 181a of the signal detecting circuit 181 through the pull-up resistor P. The pin B1 of the X− connector 132 is connected to an X− detect port 181b of the signal detecting circuit 181 through the pull-up resistor P. The pin A1 of the Y+ connector 133 is connected to a Y+ detect port 181c of the signal detecting circuit 181 through the pull-up resistor P. The pin B2 of the Y− connector 134 is connected to a Y− detect port 181d of the signal detecting circuit 181 through the pull-up resistor P.

Further, the pin B3 of the X+ connector 131 is connected to an ODD/EVEN port 181e of the signal detecting circuit 181 through the pull-up resistor P. The pin B3 of the X− connector 132 is connected to an ODD/EVEN port 181f of the signal detecting circuit 181 through the pull-up resistor P. The pin B3 of the Y+ connector 133 is connected to an ODD/EVEN port 181g of the signal detecting circuit 181 through the pull-up resistor P. The pin B3 of the Y− connector 134 is connected to an ODD/EVEN port 181h of the signal detecting circuit 181 through the pull-up resistor P.

The pins A3 of each of the X+ connector 131, the X− connector 132, the Y+connector 133, and the Y− connector 134 are connected to a slot ID port 181i of the signal detecting circuit 181. In this embodiment, the signal detecting circuit 181 can send out a signal level indicating whether the communication device is inserted into an even numbered slot (signal level "1") or an odd numbered slot (signal level "0").

The communication device D32o includes the X+ connector 231, the X− connector 232, Y+ connector 233, Y− connector 234, a signal detecting circuit 281, processor 282, memory 283, storage 284 and a plurality of pull-up resistors P.

In this embodiment, each of the X+ connector 231, the X− connector 232, Y+ connector 233, Y− connector 234, a signal detecting circuit 281, processor 282, memory 283, storage 284 and a plurality of pull-up resistors P of the communication device D32o has the same function as each of the X+ connector 131, the X− connector 132, Y+ connector 133, Y− connector 134, a signal detecting circuit 181, processor 182, memory 183, storage 184 and a plurality of pull-up resistors P of the communication device D31o respectively.

A connection checking process based on the above configuration according to the third embodiment is explained below.

In FIG. 8, the X+ connector 131 of the communication device D31o is properly connected with the X− connector 232 of the communication device D32o using communication cable 7, which has six wires, a first wire which connects the A1 pin of X+ connector 131 to the B1 pin of X− connector 232, a second wire which connects the A2 pin of X+ connector 131 to the B2 pin of X− connector 232, a third wire which connects the A3 pin of X+ connector 131 to the B3 pin of X− connector 232, a fourth wire which connects the B1 pin of X+ connector 131 to the A1 pin of X− connector 232, a fifth wire which connects the B2 pin of X+ connector 131 to the A2 pin of X− connector 232, and a sixth wire which connects the B3 pin of X+ connector 131 to the A3 pin of X− connector 232.

The connector interface on either end of the communication cable 7 is the same so that it can be joined to either X+ connector 131 and X− connector 232. However, either the pins or the connector interface on either end is configured so that the connector interface on either end of the communication cable 7 cannot be physically joined to the connector (e.g., X+ connector 131 or X− connector 232) unless the connection interface is aligned properly with respect to the pins. This ensures that, when the communication cable 7 is physically joined to the X+ connector 131 and the X− connector 232, the "1" pins (A1 and B1) are connected to each other through the first and third wires, the "2" pins (A2 and B2) are connected to each other through the second and fifth wires, the "3" pins (A3 and B3) are connected to each other through the third and sixth wires.

In this state, by connecting the pin A1 of the X+ connector 131 to the pin B1 of the X− connector 232, since the pin A1 of the X+ connector 131 is connected to the ground, the signal received at the X− detect port 281b from the pull-up resistor P between the pin B1 and the signal detecting circuit 281 will be at ground level. The processor 282 determines that the X− connector 232 is properly connected to the X+ connector 131 when the signal detected by the signal detecting circuit 281 is at ground level.

In addition, by connecting the pin A2 of the X+ connector 131 to the pin B2 of the X− connector 232, since the pin B2 of the X− connector 232 is connected to the ground, the signal received at the X+ detect port 181a from the pull-up resistor P between the pin A2 and the signal detecting circuit 181 will be at ground level. The processor 182 determines that the X+ connector 131 is properly connected to the X− connector 232 when the signal detected by the signal detecting circuit 181 is at ground level.

Further, by connecting the pin A3 of the X+ connector 131 to the pin B3 of the X− connector 232, slot ID "0 (ODD)" is sent out to the ODD/EVEN port 281*f* of the signal detecting circuit 281 through the pin A3 of the X+ connector 131 and the pin B3 of the X− connector 232. The processor 282 determines that the communication device D32*o* is properly connected to a communication device inserted into an odd numbered slot when the signal level received at the ODD/EVEN port 281*f* of the signal detecting circuit 181 is "0". The processor 182 also determines whether the communication device D31*o* is properly connected to a communication device inserted into an odd numbered slot in the same manner.

Other connectors that are properly connected (e.g., Y+ of ODD to Y− of ODD, X+ of EVEN to X− of EVEN, and Y+ of EVEN to Y− of EVEN) to are confirmed in the same manner as described above.

Figure 9:
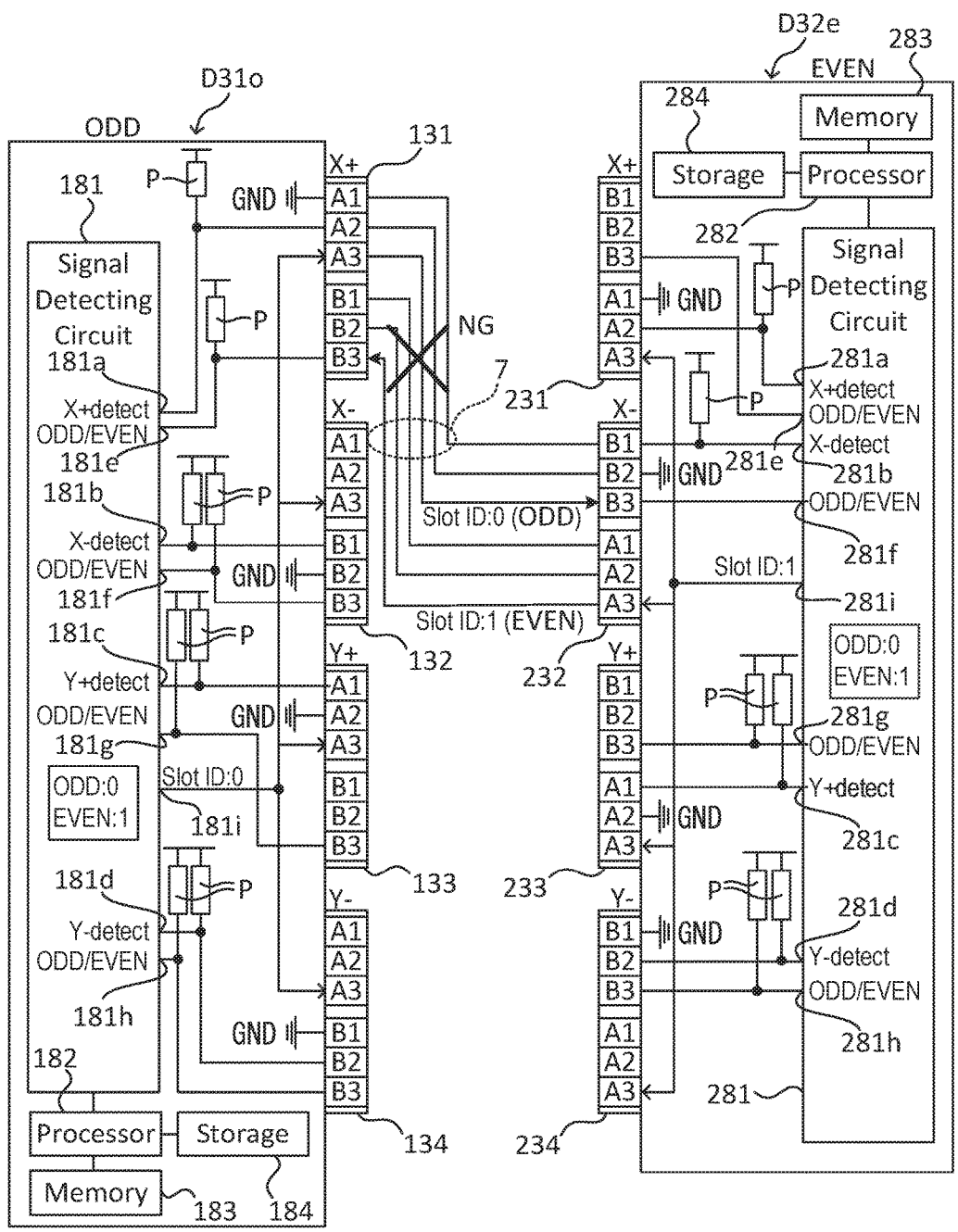
FIG. 9 is a diagram depicting an example circuit configuration of the communication devices shown in FIG. 7, and an improper connection in the example circuit configuration.

FIG. 9 is a diagram depicting an example circuit configuration of the communication devices shown in FIG. 7, and an improper connection in the example circuit configuration. In FIG. 9, the connection between the communication device D31*o* and the communication device D32*e* is shown as an example of the improper connection.

In FIG. 9, the X+ connector 131 of the communication device D31*o* is improperly connected with the X− connector 232 of the communication device D32*e*, because the communication device D32*o* and the communication device D32*e* are inserted into slots of different ODD/EVEN types. In this state, by connecting the pin A1 of the X+ connector 131 to the pin B1 of the X− connector 232, since the pin A1 of the X+ connector 131 is connected to the ground, the signal received at the x− detect port 281*b* from the pull-up resistor P between the pin B1 and the signal detecting circuit 281 will be at a ground level. The processor 282 determines that the X− connector 232 is connected to the X+ connector 131 when the signal detected by the signal detecting circuit 281 is at a ground level.

In addition, by connecting the pin A2 of the X+ connector 131 to the pin B2 of the X− connector 232, since the pin B2 of the X− connector 232 is connected to the ground, the signal received at the X+ detect port 181*a* from the pull-up resistor P between the pin A2 and the signal detecting circuit 181 will be at a ground level. The processor 182 determines that the X+ connector 131 is connected to the X− connector 232 when the signal detected by the signal detecting circuit 181 is at a ground level.

However, by connecting the pin A3 of the X+ connector 131 to the pin B3 of the X− connector 232, slot ID "0 (ODD)" is sent out to the ODD/EVEN port 281*f* of the signal detecting circuit 281 of the communication device D32*e* through the pin A3 of the X+ connector 131 and the pin B3 of the X− connector 232. The processor 282 determines that the communication device D32*e* is improperly connected to a communication device inserted into an odd numbered slot when the signal level received at the ODD/EVEN port 281*f* of the signal detecting circuit 281 is "0" instead of "1". The processor 182 also detects that the communication device D31*o* is improperly connected to a communication device inserted into an even numbered slot when the signal level received at the ODD/EVEN port 181*e* of the signal detecting circuit 181 is "1" instead of "0".

According to the third embodiment, it is possible to electrically detect the misconnection, in a case where the communication devices have four types of connectors and two types of slots, based on the signals received by the signal detecting circuits, and there is no need to prepare different types of communication cables.

Embodiments can be carried out in various forms without departing from main characteristics thereof. The embodiments are merely exemplars in every aspect and should not be limitedly interpreted. The scope of the present invention is indicated by the scope of claims. The text of the specification does not restrict the scope of the invention. All variations and various improvements, alterations, and modifications belonging to the scope of equivalents of the scope of claims are within the scope of the present invention.

What is claimed is:

1. A device having first and second connectors configured for physical connection with a cable having first and second wires, wherein each of the first and second connectors includes a first pin for connection with a first wire of the cable and a second pin for connection with a second wire of the cable, the device comprising:
   a ground terminal connected to the first pin of the first connector and to the second pin of the second connector;
   a first pull-up resistor connected to the second pin of the first connector;
   a second pull-up resistor connected to the first pin of the second connector; and
   a signal detecting circuit connected to the second pin of the first connector through the first pull-up resistor and to the first pin of the second connector through the second pull-up resistor, the signal detecting circuit being configured to detect a signal level of second pin of the first connector and to detect a signal level of first pin of the second connector.

2. The device of claim 1, further comprising:
   a processor configured to determine a state of a connection of the first connector based on a signal level detected by the signal detecting circuit,
   wherein the processor is configured to determine a proper connection to the first connector if the signal level of the second pin of the first connector is at a ground level, and an improper connection to the first connector if the signal level of the second pin of the first connector is at a level higher than the ground level.

3. The device of claim 1, further comprising:
   a processor configured to determine a state of a connection of the second connector based on a signal level detected by the signal detecting circuit,
   wherein the processor is configured to determine a proper connection to the second connector if the signal level of the second pin of the first connector is at a ground level and an improper connection to the second connector if the signal level of the first pin of the second connector is at a level higher than the ground level.

4. The device of claim 1,
   wherein the first and second connectors have the same shape and pin configuration.

5. A device having first, second, third and fourth connectors configured for physical connection with a cable having first, second, third and fourth wires, wherein each of the first, second, third and fourth connectors includes a first pin for connection with a first wire of the cable, a second pin for connection with a second wire of the cable, a third pin for connection with a third wire of the cable and a fourth pin for connection with a fourth wire of the cable, the device comprising:

a ground terminal connected to the first pin of the first connector, to the fourth pin of the second connector, to the second pin of the third connector and to the third pin of the fourth connector;

a first pull-up resistor connected to the second pin of the first connector;

a second pull-up resistor connected to the third pin of the second connector;

a third pull-up resistor connected to the first pin of the third connector;

a fourth pull-up resistor connected to the fourth pin of the fourth connector; and a signal detecting circuit connected to the second pin of the first connector through the first pull-up resistor, to the third pin of the second connector through the second pull-up resistor, to the first pin of the third connector through the third pull-up resistor, and to the fourth pin of the fourth connector through the fourth pull-up resistor, the signal detecting circuit being configured to detect signal levels of the second pin of the first connector, the third pin of the second connector, the first pin of the third connector, and the fourth pin of the fourth connector.

6. The device of claim 5, further comprising:

a processor configured to determine a state of a connection of the first connector based on a signal level detected by the signal detecting circuit, wherein the processor is configured to determine a proper connection to the first connector if the signal level of the second pin of the first connector is at a ground level, and an improper connection to the first connector if the signal level of the second pin of the first connector is at a level higher than the ground level.

7. The device of claim 5, further comprising:

a processor configured to determine a state of a connection of the second connector based on a signal level detected by the signal detecting circuit, wherein the processor is configured to determine a proper connection to the second connector if the signal level of the third pin of the second connector is at a ground level, and an improper connection to the second connector if the signal level of the third pin of the second connector is at a level higher than the ground level.

8. The device of claim 5, further comprising:

a processor configured to determine a state of a connection of the third connector based on a signal level detected by the signal detecting circuit, wherein the processor is configured to determine a proper connection to the third connector if the signal level of the first pin of the third connector is at a ground level, and an improper connection to the third connector if the signal level of the first pin of the third connector is at a level higher than the ground level.

9. The device of claim 5, further comprising:

a processor configured to determine a state of a connection of the fourth connector based on a signal level detected by the signal detecting circuit, wherein the processor is configured to determine a proper connection to the fourth connector if the signal level of the fourth pin of the fourth connector is at a ground level, and an improper connection to the fourth connector if the signal level of the fourth pin of the fourth connector is at a level higher than the ground level.

10. The device of claim 5, wherein the first, second, third and fourth connectors have the same shape and pin configuration.

11. A device having first, second, third and fourth connectors configured for physical connection with a cable having first, second, third, fourth, fifth and sixth wires, wherein each of the first, second, third and fourth connectors includes a first pin for connection with a first wire of the cable, a second pin for connection with a second wire of the cable, a third pin for connection with a third wire of the cable, a fourth pin for connection with a fourth wire of the cable, a fifth pin for connection with a fifth wire of the cable and a sixth pin for connection with a sixth wire of the cable, comprising:

a ground terminal connected to the first pin of the first connector, to the fifth pin of the second connector, to the second pin of the third connector and to the fourth pin of the fourth connector;

a first pull-up resistor connected to the second pin of the first connector;

a second pull-up resistor connected to the sixth pin of the first connector;

a third pull-up resistor connected to the fourth pin of the second connector;

a fourth pull-up resistor connected to the sixth pin of the second connector;

a fifth pull-up resistor connected to the first pin of the third connector;

a sixth pull-up resistor connected to the sixth pin of the third connector;

a seventh pull-up resistor connected to the fifth pin of the fourth connector;

an eighth pull-up resistor connected to the sixth pin of the fourth connector; and a signal detecting circuit connected to the second pin of the first connector through the first pull-up resistor, to the sixth pin of the first connector through the second pull-up resistor, to the fourth pin of the second connector through the third pull-up resistor, to the sixth pin of the second connector through the fourth pull-up resistor, to the first pin of the third connector through the fifth pull-up resistor, to the sixth pin of the third connector through the sixth pull-up resistor, to the fifth pin of the fourth connector through the seventh pull-up resistor, and to the sixth pin of the fourth connector through the eighth pull-up resistor, the signal detecting circuit being configured to detect signal levels of the second and sixth pins of the first connector, the fourth and sixth pins of the second connector, the first and sixth pins of the third connector, and the fifth and sixth pins of the fourth connector.

12. The device of claim 11, wherein the signal detecting circuit is configured to output through the third pins of the first, second, third, and fourth connectors, a first signal having a first signal level if the device is inserted into an odd numbered slot and a second signal having a second signal level if the device is inserted into an even numbered slot.

13. The device of claim 12, further comprising:

a processor configured to determine a state of a connection of the first connector based on signal levels detected by the signal detecting circuit, wherein the processor is configured to determine a proper connection to the first connector if the signal level of the second pin of the first connector is at a ground level and the signal level of the sixth pin of the first connector matches the signal level of a signal output through the third pin of the first connector, and an improper connection to the first connector if the signal level of the second pin of the first connector is at a level higher than the ground level or the signal level of the sixth pin of the first connector does not match the signal level of the signal output through the third pin of the first connector.

14. The device of claim 12, further comprising:
a processor configured to determine a state of a connection of the second connector based on signal levels detected by the signal detecting circuit,
wherein the processor is configured to determine a proper connection to the second connector if the signal level of the fourth pin of the second connector is at a ground level and the signal level of the sixth pin of the second connector matches the signal level of a signal output through the third pin of the second connector, and an improper connection to the second connector if the signal level of the fourth pin of the second connector is at a level higher than the ground level or the signal level of the sixth pin of the second connector does not match the signal level of the signal output through the third pin of the second connector.

15. The device of claim 12, further comprising:
a processor configured to determine a state of a connection of the third connector based on signal levels detected by the signal detecting circuit,
wherein the processor is configured to determine a proper connection to the third connector if the signal level of the first pin of the third connector is at a ground level and the signal level of the sixth pin of the third connector matches the signal level of a signal output through the third pin of the third connector, and an improper connection to the third connector if the signal level of the first pin of the third connector is at a level higher than the ground level or the signal level of the sixth pin of the third connector does not match the signal level of the signal output through the third pin of the third connector.

16. The device of claim 12, further comprising:
a processor configured to determine a state of a connection of the fourth connector based on signal levels detected by the signal detecting circuit,
wherein the processor is configured to determine a proper connection to the fourth connector if the signal level of the fifth pin of the fourth connector is at a ground level and the signal level of the sixth pin of the fourth connector matches the signal level of a signal output through the third pin of the fourth connector, and an improper connection to the fourth connector if the signal level of the fifth pin of the fourth connector is at a level higher than the ground level or the signal level of the sixth pin of the fourth connector does not match the signal level of the signal output through the third pin of the fourth connector.

17. The device of claim 11,
wherein the first, second, third and fourth connectors have the same shape and pin configuration.

* * * * *